(12) United States Patent
Rudow et al.

(10) Patent No.: US 11,700,079 B2
(45) Date of Patent: Jul. 11, 2023

(54) OPTRONIC SYSTEM FOR A COUNTERMEASURE UNIT AND METHOD TO OPTICALLY COMMUNICATE

(71) Applicants: HENSOLDT Sensors GmbH, Taufkirchen (DE); Fraunhofer-Gesellschaft zur Forderung der angewandten Forschung e.V., Munich (DE)

(72) Inventors: Oliver Rudow, Hohenbrunn (DE); Marc Eichhorn, Rickenbach (DE); Christelle Kieleck, Wintzenbach (FR)

(73) Assignees: HENSOLDT SENSORS GMBH, Taufkirchen (DE); FRAUNHOFER-GESELLSCHAFT ZUR FORDERUNG, Munich (DE)

( * ) Notice: Subject to any disclaimer, the term of this patent is extended or adjusted under 35 U.S.C. 154(b) by 0 days.

(21) Appl. No.: 17/382,870

(22) Filed: Jul. 22, 2021

(65) Prior Publication Data

US 2022/0029732 A1    Jan. 27, 2022

(51) Int. Cl.
*G01S 7/495* (2006.01)
*H04B 10/40* (2013.01)
(Continued)

(52) U.S. Cl.
CPC .............. *H04K 3/827* (2013.01); *F41H 11/02* (2013.01); *G01S 7/495* (2013.01); *H04B 10/40* (2013.01); *H04B 10/61* (2013.01); *H04K 3/44* (2013.01); *H04K 3/45* (2013.01); *H04K 3/822* (2013.01); *H04K 2203/22* (2013.01); *H04K 2203/24* (2013.01)

(58) Field of Classification Search
CPC ........ H04B 10/40; H04B 10/112–1129; G01S 7/495
See application file for complete search history.

(56) References Cited

U.S. PATENT DOCUMENTS

| 6,707,052 B1 * | 3/2004 | Wild | F41H 11/02 342/14 |
| 7,040,780 B2 * | 5/2006 | Diehl | F41H 13/0056 362/86 |

(Continued)

*Primary Examiner* — Nathan M Cors
(74) *Attorney, Agent, or Firm* — FisherBroyles, LLP; James W. Hill; Andrew K. Gonsalves (57) ABSTRACT

An optronic system (100) for a countermeasure unit (10) to optically communicate with another communication terminal is disclosed. The countermeasure unit (10) comprises a laser beam source (12) and a directing device (14) for a laser beam (15) of the laser beam source (12) and is configured to dazzle or to jam an object of threat (50). The optronic system (100) comprising: a detector (110), a modulation unit (120), and a control unit (130). The detector (110) is configured to detect an incoming communication in an incoming signal (25). The modulation unit (120) is configured to demodulate the incoming signal (25) or cause a modulation of an outgoing laser beam (15). The control unit (130) is configured, in response to the detected incoming communication, to control the modulation unit (120) to demodulate the incoming signal (25) or to modulate the outgoing laser beam (15) to enable an optical communication via the laser beam source (12) of the countermeasure unit (10).

13 Claims, 4 Drawing Sheets

(51) Int. Cl.
 *H04K 3/00* (2006.01)
 *F41H 11/02* (2006.01)
 *H04B 10/61* (2013.01)

(56) References Cited

U.S. PATENT DOCUMENTS

| | | | | |
|---|---|---|---|---|
| 9,964,633 B1 * | 5/2018 | Freebersyser | ...... | H04B 10/1123 |
| 2002/0153497 A1 * | 10/2002 | Pepper | ...... | G01S 7/4816 |
| | | | | 250/495.1 |
| 2007/0075182 A1 * | 4/2007 | Fetterly | ...... | F41G 7/224 |
| | | | | 244/3.15 |
| 2013/0177322 A1 * | 7/2013 | DeVaul | ...... | H04B 7/18504 |
| | | | | 398/131 |

* cited by examiner

OPTRONIC SYSTEM FOR A COUNTERMEASURE UNIT AND METHOD TO OPTICALLY COMMUNICATE

The present invention relates to an optronic system for a countermeasure unit and to a method for controlling the countermeasure unit to optically communicate with another communication terminal. The present invention relates in particular to an optronic system for countermeasures (CM) and laser communication.

BACKGROUND

Guided missiles represent a threat for all kind of vehicles such as land vehicles, ships, helicopters and aircrafts. For example, a shooter or a sighting device may use a sighting optics to direct the guided missile into the vehicle. The sighting optics communicates with the control electronics of the guided missile and transfers any required steering commands. Other threats may come from surface to air missiles such as man-portable air-defense systems or systems with a sighting optic. Such a target acquisition constitutes the threat which is to be prevented by countermeasures as far as possible.

Figure 4:
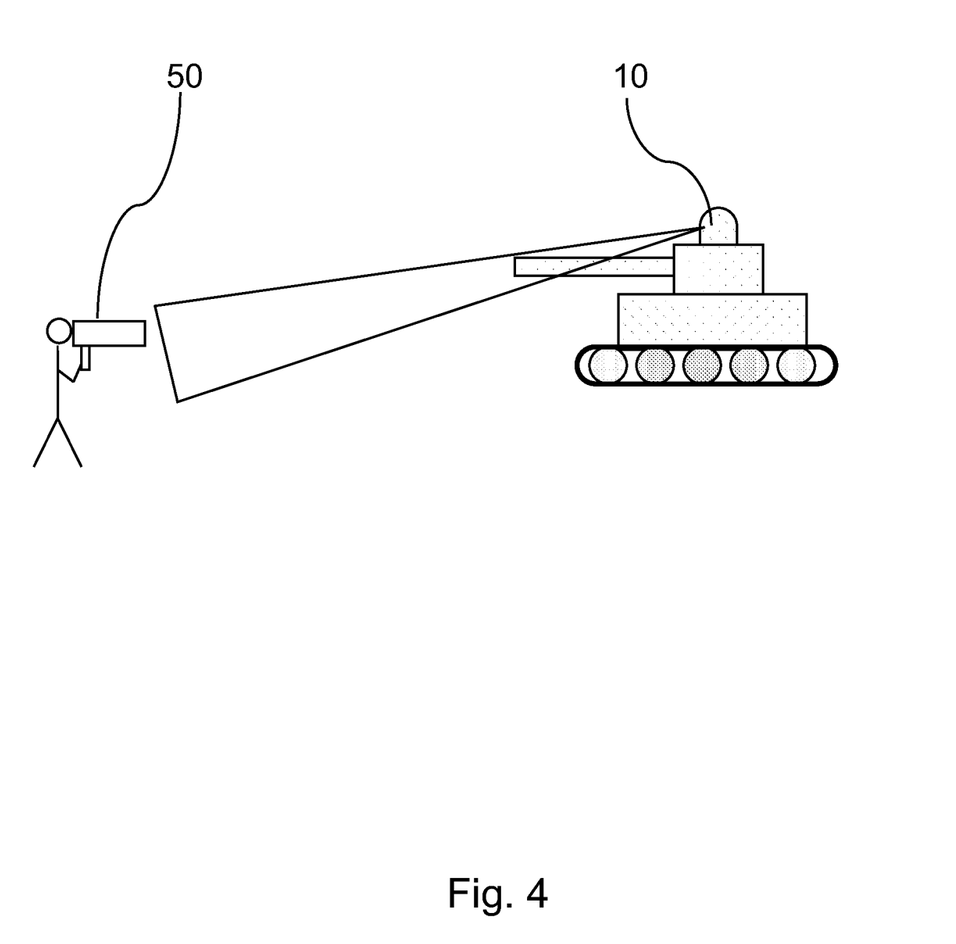
FIG. 4 illustrates a conventional optical jammer.

FIG. 4 depicts a usage of an exemplary convention countermeasure unit 10, where a target acquisition is performed by an exemplary shooter using a sighting device 50. The target acquisition or target tracking may also be performed by a sighting device or an optical recording device, as for example a camera, without the need of any human interaction. The countermeasure device 10 will detect the target acquisition and provides a jamming or dazzling to prevent the exemplary shooter 50 from target tracking.

The employed countermeasures may use lasers systems with various wavelengths that use the atmospheric transmission bands. Especially for directed infrared (IR) countermeasures appropriate laser sources provide countermeasure-specific radiation and couple to highly agile transmission optical turrets that allow addressing dynamically the incoming target (e.g. IR-guided missile). As the IR missile seeker usually targets heat sources, which are incoherent sources, the countermeasure laser is modulated in its amplitude to jam the missile seeker (on-off-modulation). The detection of the missile and the direction of the laser beam to the target occurs via an additional warning system such as missile warning, laser warning, hostile fire indicator that may provide 3D coordinates of the threat to the turret. Typical laser operating modes for CM lasers in Jamming mode are Q-switch or continuous-wave operation with on-off switching or non-linear conversion of the radiation of the laser operating on these modes.

U.S. Pat. No. 9,964,633 B1 discloses a conventional airborne infrared countermeasure system and a method for establishing a communication between two flying objects, wherein locations are transmitted to point a light source to the other object. In addition, "requests to send" are used to send data packages alternately. This system, however, requires an accurate positioning to maintain the communication.

Since advanced laser systems are most of the time in an idle mode, there is a further demand to find further applications for a laser-based countermeasure unit which can be efficiently kept alive and allow a high bandwidth communication.

SUMMARY OF THE INVENTION

At least some of the above-mentioned problems are solved by an optronic system according to claim 1 and a corresponding method according to claim 13. The dependent claims refer to further advantageous realizations for the subject matters of the independent claims.

The present invention relates to an optronic system for a countermeasure unit to optically communicate with another communication terminal. The countermeasure unit comprises a laser beam source and a directing device for a laser beam of the laser beam source and is configured to dazzle or to jam an object of threat. The optronic system comprises a detector, a modulation unit, and a control unit. The detector is configured to detect an incoming communication in an incoming signal (e.g. a modulated laser signal). The modulation unit is configured to demodulate the incoming signal or cause a modulation of an outgoing laser beam. The control unit is configured, in response to the detected incoming communication, to control the modulation unit to demodulate the incoming signal or to modulate the outgoing laser beam to enable an optical communication via the laser beam source of the countermeasure unit.

The modulation unit may in particular be suitable to establish and maintain a continuous communication link without the need to establish the link for each package. For example, the detector may be used for an efficient tracking. It is understood that the optronic system may be implemented as part of the countermeasure unit (e.g. integrated into it), because the countermeasure unit may include already all needed components, including a control capability for the laser to allow a modulation suitable for the communication. The optronic system may, however, also be implemented as a separate system (e.g. as a retrofitting).

The countermeasure unit represents, for example, a jammer or a dazzling device that acts as a countermeasure device to neutralize a threat. The source of the threat may come from a vehicle or a shooter and may include flying objects such as helicopters or guided missiles or other objects. Since the countermeasure units are employed only occasionally, embodiments use the available laser source during idle times for providing an optical communication with other communication terminals of a third party such as other vehicles (air, land or sea) or with a ground station or other recipients for the communication.

The countermeasure unit may comprise a tracking camera configured to capture images from a scene with the other communication terminal. Then, optionally, the control unit is further configured to control the tracking camera to direct the laser beam during the optical communication by stabilizing the laser beam directed to the other communication terminal. The tracking camera may, in particular, be configured to enable a detection of a direction towards the object of threat or towards the other communication terminal to enable a tracking of the transmitted laser beam to the object of threat or to the other communication terminal.

The directing device of the countermeasure unit may be configured to track the object of threat (e.g. when it moves). Then, optionally, the control unit is further configured to control the directing device to adjust a direction of the outgoing laser beam onto a moving other communication terminal. The countermeasure unit may in particular be configured to use or to control the tracking camera in order to enable the tracking. This can be achieved, for example, by analyzing images captured by the camera and to identify in the images the object of threat and/or the other communication terminal.

The countermeasure unit and/or the detector may be configured to detect a threat from the object. Then, optionally, the control unit is further configured to interrupt the optical communication upon a detection of the treat and to trigger countermeasures for dazzling or jamming the object of threat.

It is understood that the function of the countermeasure unit may have a priority over the communication system so that in case an object of threat appears, the communication should be interrupted in order to enable countermeasures to neutralize the object of threat. However, according to further embodiments, the control unit may be configured to jam or dazzle the object of threat while providing the optical communication to the other communication terminal (i.e. in parallel or more or less at the same time). This is, for example, possible by a time multiplexing so that with a predetermined periodicity the object is jammed, whereas during the other time slots in between jamming the laser source is used to transmit information to the other communication terminal. Furthermore, if the other communication terminal is positioned in an angular region so that the communication can be received by the communication terminal while the object of threat is jammed, the communication can be modulated during the jamming or dazzling of the object of threat. This parallel operation can be achieved by phase modulating the transmitted information and be amplitude modulation to jam the object of threat.

Optionally, the detector includes a retroreflection detector. The retroreflection detector may be configured to one or more of the following:
- to detect signals reflected by the other communication terminal due retroreflections,
- to initiate the optical communication based on detected retroreflections,
- to keep alive a laser communication path (e.g. by tracking to maintain a reflection signal).

The retroreflection detector can, for example, be used to analyse incoming missiles with respect to distance, lateral acceleration and velocity, threat induced signal modulation due to chopping. For example, they sense a reflected signal based on the used characteristics (e.g. used wavelength, frequency, modulation etc.) and the direction from where the reflected signal arrives so that after a retroreflection detection, this signal can be used to keep alive the laser communication path or also to initiate the laser communication.

The retroreflection detector may thus detect signals that are emitted by the optronic system or by countermeasure unit. This detection may be based on a specific signature used for the laser light such as the frequency, a modulation, a pulse periodicity or other known parameters. Therefore, when a communication link is established, the reflected parts of the signals can continuously be detected and the direction of the laser beam can be aligned or corrected accordingly. Therefore, even if the participants move, the communication link can be maintained without the need of re-establishing a lost link. This provides the advantage that no position or location information are needed for the communication. For example, the retroreflection detector can—after an initial laser scan—detect potential communication partners without knowing their exact position (only the direction). After the link is established, the system can maintain the link automatically (by the tracking).

Optionally, the detector includes a laser communication detector. The laser communication detector may include a local oscillator for coherent detection and may be configured to detect a modulated incoming communication beam. Since the expected modulation format should be known to both communicating partners, the detection of modulated optical signals should represent no problems. It is well known in the art how to detect and to demodulate a communication signal.

For this, the laser communication detector may be configured to provide a fast response time for the employed wavelength of interest and may use the a (low-power) local oscillator for the coherent detection. For example, if a phase modulation format is used, the local oscillator may have the carrier frequency so a phase modulated signal can be demodulated (e.g. via a phase-locked loop circuitry).

Optionally, the modulation unit is configured to modulate the outgoing laser beam during optical communications using different modulation formats when compared to using the laser beam during countermeasure operations. The different modulation formats may include a coherent modulation and/or a non-coherent modulation.

Optionally, the modulation unit is configured to use a phase modulation format during optical communications.

Embodiments relates also to a countermeasure system for jamming or dazzling a target acquisition. The countermeasure system comprises: a laser beam source configured to generate a laser beam, a directing device for directing the laser beam on a target to be dazzled or to be jammed or on another communication terminal of a laser communication. The countermeasure system further includes the optronic system as defined before.

Optionally, the laser beam source is configured to generate the laser beam for the optical communication with a wavelength which is unreconnaissable per detection such as one of the following frequency/wavelengths bands:
- short wave infrared, SWIR, comprising wavelengths between 1.4-2.0 micrometers,
- extended short wave infrared, eSWIR, comprising wavelengths between 2.0-2.5 micrometers,
- mid infrared, MIR, comprising wavelengths between 3.0-5.0 micrometers.

It is understood that unreconnaissable communication can be achieved by a laser beam that does not scatter in air so that no eavesdropping is possible. Only scattered or reflected signals can be received a third party. The reflection can be minimized by the correct alignment (using e.g. the reflection detector as described above) and the scattering can be minimized by the mentioned wavelengths. Therefore, the reconnaissance of the communication is not possible by simple means.

According to further embodiments, the laser beam source includes a switchable laser between different operation modes (e.g. using a frequency multiplier, frequency shift, filters etc).

Optionally, the countermeasure system further comprises countermeasure modulation unit configured to cause a modulation of an outgoing laser beam to dazzle or to jam the object of threat as a countermeasure. For example, in the countermeasure mode, the colors of the light are constantly changing making it impossible to frequency filter the jamming signal (for example, by a respective filter). The constantly changing colors have a multiplication effect on contrast reduction or the dazzling effect.

Embodiments relates also to a vehicle with the countermeasure system as defined before. The vehicle may be a land vehicle, sea vehicle or an air vehicle, and may be manned are unmanned (like missiles or drones).

Embodiments relates also to a method for controlling a countermeasure unit to optically communicate with another communication terminal. The countermeasure unit comprises a laser beam source and a directing device for a laser beam of the laser beam source. The method comprises:
- detecting an incoming communication in an incoming signal; and demodulating the incoming signal or causing a modulation of an outgoing laser beam to enable the optical communication via the laser beam source of the countermeasure unit.

Optionally, the method further comprises a switching between a laser communication mode and a countermeasure mode. For example, in the laser communication mode, the laser beam source is caused to modulate the outgoing laser beam to transmit information (e.g. using a phase modulation format). In the countermeasure mode, the laser beam source may be caused to modulate the outgoing laser beam to dazzle or to jam an object of treat (e.g. changing the frequency, amplitudes etc.).

It is apparent that embodiments overcome at least some of the problems of conventional system. For example, a single unit may accommodate a multifunctional optical laser terminal for various platforms (ground-based, flying, swimming) and allows at the same time countermeasure actions as well as a high-speed communication capability. A higher system integration is thus achieved.

Embodiments are suitable for a directable laser-based countermeasure such as a DIRCM and/or DAZZLER and/or JAMMER with an integrated Laser Communication System in one system to end up in a low size, weight and power (SWaP) system. The system can be easily integrated in a platform such as a helicopter, aircrafts, land vehicle or ship.

Finally, embodiments use specific emission bands to make the communication link unreconnaissable by detection and as a result not readable to third parties.

BRIEF DESCRIPTION OF THE DRAWINGS

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
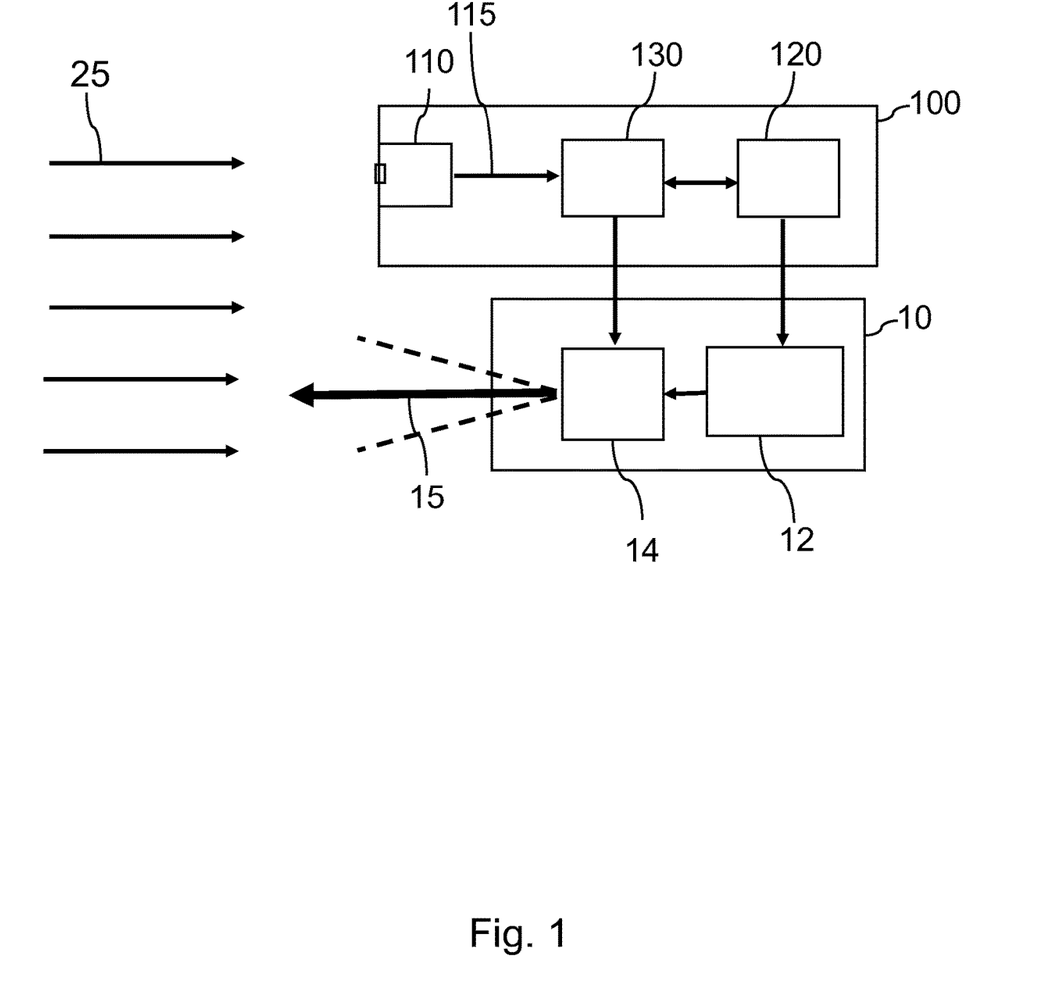
FIG. 1 depicts an embodiment for an optronic system.

FIG. 1 depicts an embodiment for an optronic system 100, which is configured to be used in conjunction with a countermeasure unit 10 to provide an optical communication with another communication terminal, which may be a friendly partner or a base station (in general different from the target of the countermeasures).

The countermeasure unit 10 is configured to dazzle or to jam an object of threat (e.g. the exemplary shooter or sighting device 50 in FIG. 4) and comprises a laser beam source 12 and a directing device 14 for the laser beam 15 of the laser beam source 12. The optronic system 100 comprises a detector 110 which is configured to detect an incoming communication modulated in an incoming signal 25 and to issue, upon a detection, a detection signal 115. The detection signal 115 may also be a warning if a potential threat is detected by the detector 110. The optronic system 100 further comprises a modulation unit 120 which is configured to demodulate the incoming signal 25 or cause a modulation of an outgoing laser beam 15. The incoming signal 25 may be, in particular, a modulated laser signal.

The optronic system 100 may also comprise a control unit 130 which is configured, in response to the detected incoming communication indicated by the detection signal 115, to control the modulation unit 120 to demodulate the incoming signal 25 or to modulate the outgoing laser beam 15 to enable the optical communication via the laser beam source 12 of the countermeasure unit 10. The control unit 130 may be configured to cause the optronic system 100 to be placed in a communication mode or in a countermeasure mode. In the communication mode the control unit 130 may control the modulation unit 120 to modulate or demodulate information in the laser beam 15, and to control the directing device 14 to direct the laser beam 15 on a remote station. In the countermeasure mode, the control unit 130 may be configured to allow the laser beam 15 to be directed on a target.

The countermeasure unit 10 may include a further control device (not shown) to control the laser beam source 12 to act as a jammer or as dazzling device. For example, to act as optical jammer the laser beam source 12 may comprise one or more of the following: a multispectral laser, a multispectral LED (or an LED laser) or a LED array as light or radiation sources and may be an integrated component of the unit 10. An external radiation source may be used, too. The laser beam source 12 may also comprise a respective control electronics in order to modulate the light in an adequate way.

In the communication mode, embodiments may enable a high data-rate optical communication based on a laser to send information to a dedicated receiver with the other communication terminal. Thus, the laser source 12 shall not be limited to particular lasers or laser frequency bands. The employed band may be selected based on the situation. For example, if a potential eavesdropping is not an issue all bands may be used such as: VIS (visible spectrum) or any of the infrared bands: NIR (near infrared), SWIR (short wave infrared), eSWIR (extended short wave infrared), MIR (med infrared), LWIR (long wave infrared).

On the other hand, the typical "telecom" laser-communications use bands with low noise and well-established detectors, which are in the 1064 nm and 1550 nm range. This makes them easily reconnaisable and partially also readable to third parties. In addition, existing laser communication systems do not provide appropriate beam parameters, power and signal capabilities needed for countermeasures. Therefore, it is of advantage to use one of the infrared bands to make the communication unreconnaisable—even though the data throughput is not as high as for the "telecom" laser-communication bands. But the invention shall not be limited on a particular frequency band, as long as all situational needs are met.

Likewise, according to further embodiments, various modulation formats of the laser beam 15 may be employed for the communication to transmit information depending on the type of data, noise performance of the link and data rate that is to be achieved. Typical on-off-modulation, also called On-Off-Keying (OOK), however, provides poorest performance as it can only carry at maximum, i.e. at high signal to noise ratios, an information rate (bits/s) transmitted per unit bandwidth (Hz) of 1 bit/s/Hz. Therefore, high-data-rate laser communication systems operate on a coherent modulation technique in which amplitude and phase are modulated simultaneously. These types of modulation formats achieve considerable higher information rates, e.g. 2 bit/s/Hz for Quadrature Phase-Shift-Keying ((PSK), 3 bit/s/Hz for Eight-point Phase-Shift-Keying (8-PSK), 4 bit/s/Hz for 16-point Quadrature-Amplitude-Modulation (16-QAM), 5 bit/s/Hz for 32-point Quadrature-Amplitude-Modulation (32-QAM) and 6 bit/s/Hz for 64-point Quadrature-Amplitude-Modulation (64-QAM). Polarization Division Multiplexing (PDM) may lead to further enhancement of the information rate. Typical laser operation modes for coherent communication is narrow-band cw (continuous wave) operation modulated in amplitude and phase in the output beam. Embodiments may use any of these modulations.

Particularly advantageous embodiments use for the laser communication an adapted countermeasure laser such as the Mid-IR Band 1 and/or Band 4a/b Lasers, because they are unreconnaissable per detection and thus are not readable to third parties. This effect is first achieved by the fact that the mid-IR wavelengths are much less scattered in air and thus much less detectable from the side, especially taking into account the already existing natural background radiation. Furthermore, embodiments may use, in particular, a coherent data transmission, because the phase information needed to reconstruct the data is lost during scattering. Thus, an eavesdropper would need to place the detector directly into the beam to obtain a useful signal—which can be excluded or is simply impossible in dynamic scenarios.

Figure 2:
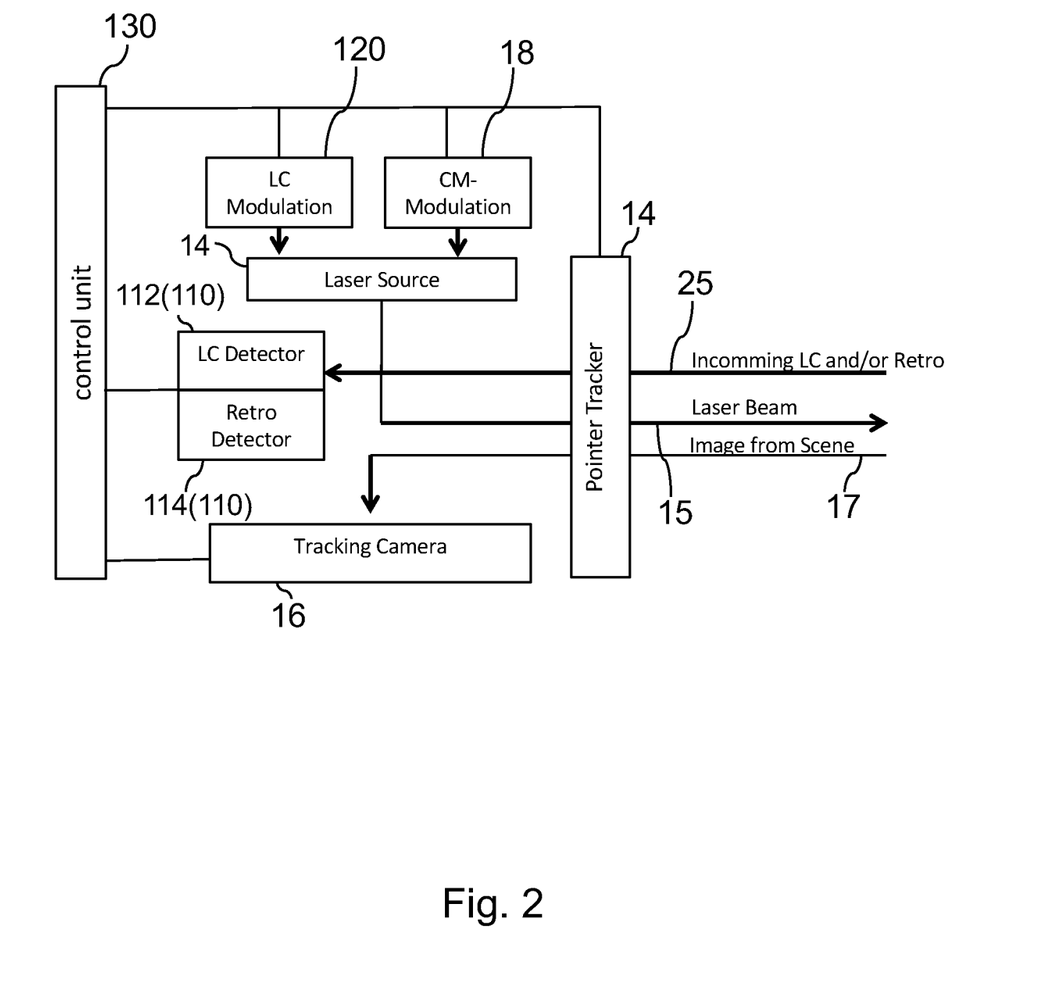
FIG. 2 illustrates further details of a countermeasure system for jamming or dazzling a target acquisition.

FIG. 2 illustrates further details of a countermeasure system for jamming or dazzling a target acquisition which includes the countermeasure unit 10 and the optronic system 100. The countermeasure unit 10 comprises the laser beam source 12, the directing device 14, a tracking camera 16, and a countermeasure modulation unit 18. The laser beam source 12 is configured to generate the laser beam 15 which is directed by the directing device 14 on a target to be dazzled or jammed or to the other communication terminal for the optical communication.

The tracking camera 16 is configured to capture images from the scene 17, which can be analyzed and used for tracking the laser beams 15. The tracking camera 16 may further stabilize the laser beam 15 on a target, i.e. the threat in countermeasure mode, or on a remote station in the laser communication mode.

The countermeasure modulation unit 18 may be configured to modulate the laser beam source 12 to provide a dazzling effect, a camouflage effect (disappearing of any contrasts in front of the background), an irritation or other effects (for example, sickness) caused at the shooter, whereby target tracking is made impossible or becomes at least more difficult. In addition, it is also possible to vary the wavelength of the laser beam source 12 resulting in light signals having different colors, and makes countermeasures, as for example laser safety glasses, more difficult. If the wavelength of the jamming signal shall continuously varied, a broadband filter would have to be used, which would result in filtering out any light, and a shooter would not have any visual contact any more.

The directing device 14 may include an optic and/or a movable mirror to direct the laser beam 15. The images from the scene 17 may be taken directly by the tracking camera 16 or may be guided via an optic of the directing device 14 to the tracking camera 16. It is also possible that the location of the directional device 14 or of the last beam source 12 is concealed. In particular, an active camouflage may be performed, for example by beam deflection (so-called scanning or switching). Thus, for example, the jamming signal 15 may be emitted from different positions at the same time, constantly successively in time, or variably over time.

For this, the system may include a device for determining a spectral radiation range a spatial region representing a background (region opposite to the region from which the target acquisition is performed). This device may in particular comprise a spectrum analyzer or an optical recording device (for example, a camera) which is adapted to determine the background spectrum (in the direction of target acquisition). Based on the analysis of the device, the optical jammer may spectrally adapt the jamming signal to the background, thus realizing an effective camouflage (in general, the potential shooter perceives only the background). This way, the jamming signal of the laser beams source 12 may be adaptively aligned with the background (spectrally), so that the jamming signal has the same or a similar wavelength as a spectral component of the background radiation (for example, in a spectral range which is mainly existing in the background). Thus, the system or the object (for example, an airplane, water vehicle, or land vehicle) on which the system is installed may not be recognized in front of the background or may hardly be recognized.

In exemplary embodiments the directing device 14 and/or the laser beam source 14 may be configured to achieve the dazzling effect at the shooter or the used optical recording device. The dazzling effect may for example cause an overstimulation or a removal of a stimulus, for example by modulated signals. As a result, the contrast of the complete scenery is at least reduced. This way, the exemplary shooter or the optical recording device is also not able to identify and track the target any more. It is also possible to choose the jamming signal in a way which causes a lack of concentration at the shooter. As a result, the shooter is not able to constantly track his/her target anymore during the attack, thus the attack has to be canceled.

The detector 110 includes in the embodiment of FIG. 2 a laser communication detector 112 and a retroreflection detector 114. The laser communication detector may enable a fast response time for the wavelengths of interest and may comprise a small-power local oscillator for coherent detection. The retroreflection detector may be used to initiate the communication and to keep alive the laser communication path.

The control unit 130 may be configured to control or access the various components of the system of FIG. 2 such as the laser communication modulation unit 120, the countermeasure modulation unit 18, the directing device 14, the detector 110 with the laser communication detector 112 and the retroreflection detector 114, and the tracking camera 16. The control unit 130 may also be configured to obtain images or information from the tracking camera 16.

It is understood that the detector 110 of the optronic system 100 may also be configured to provide detections of an object of threat 50 so that after providing a respective information to the control unit 130 the control unit 130 may initiate the countermeasure signals by controlling the countermeasure modulation unit 18 and the laser beam source 12 accordingly. Furthermore, the control unit 130 may also control the directing device 14 in order to direct the laser beam 15 to the target or to the other communication terminal.

The system may further comprise a warning device for outputting a warning 115. The warning device may be part of the detector 110, but may also be separate unit. The warning device serves to identify the threat and, for example, comprises at least one of the following warning devices: a missile warning device, a laser warning device, a so-called sniper detector, a hostile fire indicator. In further exemplary embodiments, the detector 110 is part of the warning device and thus triggers the warning 115 to automatically cause the system 100 to emit the jamming signal. However, the warning system may also delay the activation of the laser beam source 12/the directing device 14 in order to first enable an assessment of the threat level (for example, by visual inspection) and cause emittance of the jamming signal only after confirmation.

According to further embodiments, the laser beam source 12 may be switchable between different modes related to different frequencies which can be used either for the countermeasure signals or for the laser communication signals.

According to further embodiments the countermeasure unit 10 is an optical jammer and can be configured to provide a multispectral light signal 15, in particular a pulsed or continuous laser signal as a jamming signal, wherein the countermeasure unit 10 provides the jamming signal using wavelengths which may be varied by switchable wavelengths (in an arbitrary way), for example by predetermined filters. The multispectral light signals 15 may comprise several wavelengths but may also include several spectral parts which are non-visible, e.g. infrared light signals or in the near, middle or far infrared spectral signals.

According to further embodiments, the countermeasure unit 10 may be part of a protection system having arm integrated target acquisition which automatically provides one or more of the following features: the identification of a sniper by the detector 110 (or another detector) which detects exemplary muzzle fire of a rifle (a so-called muzzle fire detector). Furthermore, the detection may include an identification of the sniper by a scanning laser system which uses the retroreflection detector 114 of a telescopic sight in order to recognize the shooter (a so called sniper detector or glint detector). In addition, a weapon system can be identified by means of a scanning laser system which uses retroreflections and sighting optics (a so-called glint detector). Furthermore, an approaching guided missile can be identified by means of a missile warning system. Furthermore, a laser-controlled missile may be identified by a so-called beam rider by means of a laser warning system.

Figure 3:
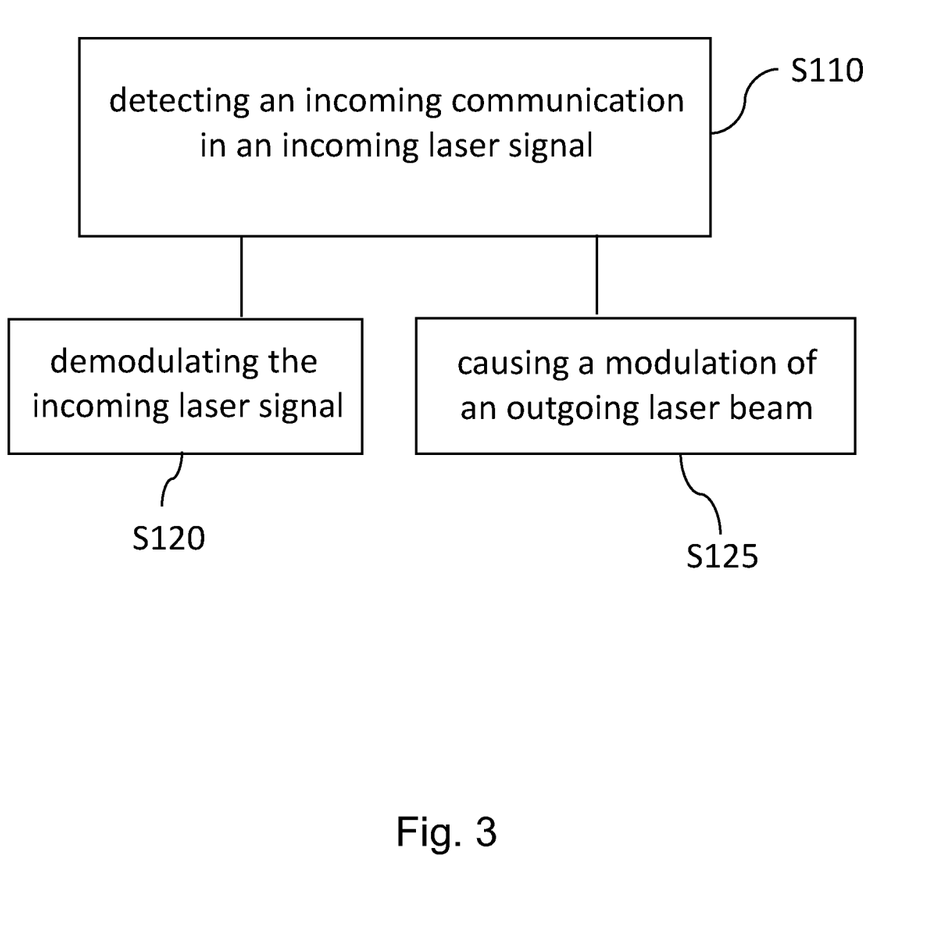
FIG. 3 depicts schematically a flow chart for a method for controlling a countermeasure unit to optically communicate with another communication terminal.

FIG. 3 depicts schematically a flow chart for a method for controlling a countermeasure unit 10 to optically communicate with another communication terminal. The method comprises:

detecting S110 an incoming communication in an incoming laser signal; and
 demodulating S120 the incoming laser signal or causing S125 a modulation of an outgoing laser beam to enable the optical communication via the laser beam source of the countermeasure unit.

The drawbacks of conventional systems that implement the communication unit and the countermeasure unit as separate components are overcome by embodiments. The different requirements of a laser countermeasure and laser communication are combined in an integrated platform. Furthermore, embodiments allow both components be present—even on platforms, where the number of positions with optimum optical coverage of the surrounding space is limited. There is no interference with other systems on that same platform. Even on platforms that cannot accommodate two stand-alone units, one for countermeasure and one for communication, are able to provide both capabilities. In other words, embodiments provide particular advantages on such platforms, where conventionally the decision had to be made to skip one of both capabilities.

By the particular modulation in combination with adapted controlling of the laser beams source 12, embodiment further overcome the drawback of existing countermeasure systems that cannot be used for unreconnaissable (unreadable) communication due to the limited signal modulation capabilities (corresponding to a very low rate On-Off-Keying), which is insufficient for high-speed real-time communication or even real-time coordination or control/steering of multiple assets in combat.

According to embodiments, the countermeasure laser unit 10 is adapted to fulfill the following functionalities:
 countermeasure laser can jam and/or dazzle the threat;
 enable a switching laser mode of operation from countermeasure mode to communication mode and back or simultaneous operation of communication capability while performing countermeasure actions;
 initiating and keep alive of a laser communication path by tracking the retro-reflection (using the retroreflection detectors 114) or beacon signal from other communication terminals;
 transfer of information by laser signal using different modulation modes (coherent or non-coherent);
 selection of suitable wavelength band or bands for secure communication (e.g. specific lines for coherent communication).

As a result, embodiments allow a low-SWaP like design with a high integration of a countermeasure unit 10 and a laser communication system (system 100) based on commonly used hardware and software. Therefore, embodiments provide more functionality than the sum of the functions of each individual system. In particular, the laser communication is unreconnaissable to third parties.

This allows for an increase in survivability and at the same time the capability of more complex missions as well as better real-time coordination between various assets in combat and/or reconnaissance operations.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 to countermeasure unit
12 laser beam source
14 directing device
15 (transmitted) optical signal
16 tracking camera
17 image from the scene
18 countermeasure modulation unit
50 target (object of threat)
100 optronic system
110 detector(s)
112 laser communication detector
114 retroreflection detector
115 detection signal (e.g. a warning)
120 modulation unit
130 control unit

The invention claimed is:

1. An optronic system for a countermeasure unit to optically communicate with another communication terminal, the countermeasure unit comprises a laser beam source and a directing device for a laser beam of the laser beam source, the optronic system comprising:
a detector configured to detect an incoming communication in an incoming signal;
a modulation unit configured to demodulate the incoming signal or cause a modulation of an outgoing laser beam by a coherent modulation in which an amplitude and a phase is modulated simultaneously; and
a control unit configured, in response to the detected incoming communication, to control the modulation unit to demodulate the incoming signal or to modulate the outgoing laser beam to enable an optical communication via the laser beam source of the countermeasure unit,
wherein the detector includes a retroreflection detector, the retroreflection detector being configured:
to detect signals reflected by the other communication terminal due retroreflections,
to initiate the optical communication based on detected retroreflections, the optical communication being performed via the laser source of the countermeasure unit, and
to keep alive a laser communication path by tracking retroreflections.

2. The system according to claim 1, wherein the countermeasure unit further comprises a tracking camera configured to capture images from a scene with the other communication terminal,
the control unit being further configured to control the tracking camera to direct the laser beam during the optical communication by stabilizing the laser beam directed to the other communication terminal.

3. The system according to claim 1, wherein the directing device of the countermeasure unit is configured to track the object of threat,
the control unit being further configured to control the directing device to adjust a direction of the outgoing laser beam onto a moving other communication terminal.

4. The system according to claim 1, wherein the countermeasure unit or the detector is configured to detect a threat from the object,
the control unit being further configured to interrupt the optical communication upon a detection of the threat and to trigger countermeasures for dazzling or jamming the object of threat.

5. The system according to claim 1, wherein
the detector includes a laser communication detector, the laser communication detector including a local oscillator for coherent detection and being configured to detect a modulated incoming communication beam.

6. The system according to claim 1, wherein the modulation unit is configured to modulate the outgoing laser beam during optical communications using different modulation formats when compared to using the laser beam during countermeasures, the different modulation formats include coherent or non-coherent modulations.

7. The system according to claim 6, wherein the modulation unit is configured to use a phase modulation format during optical communications.

8. A countermeasure system for jamming or dazzling a target acquisition, the countermeasure system comprising:
a laser beam source configured to generate a laser beam;
a directing device for directing the laser beam on a target or on another communication terminal of a laser communication; and
an optronic system according to claim 1.

9. The countermeasure system according to claim 8, wherein the laser beam source is configured to generate the laser beam for the optical communication with a wavelength in one of the following frequency bands:
short wave infrared, SWIR, comprising wavelengths between 1.4 to 2.0 micrometers,
extended short wave infrared, eSWIR, comprising wavelengths between 2.0 to 2.5 micrometers,
mid infrared, MIR, comprising wavelengths between 3.0 to 5.0 micrometers.

10. The countermeasure system according to claim 8, further comprising countermeasure modulation unit configured to cause a modulation of an outgoing laser beam to dazzle or to jam the object of threat as a countermeasure.

11. A vehicle with the countermeasure system according to claim 8.

12. A method for controlling a countermeasure unit to optically communicate with another communication terminal, the countermeasure unit comprising a laser beam source and a directing device for a laser beam of the laser beam source, the method comprising:
- detecting an incoming communication in an incoming signal; and
- demodulating the incoming signal or causing a modulation of an outgoing laser beam by a coherent modulation in which an amplitude and a phase is modulated simultaneously to enable the optical communication via the laser beam source of the countermeasure unit,
- wherein detecting includes:
  - detecting signals reflected by the other communication terminal due to retroreflections,
  - initiating the optical communication based on detected retroreflections, the optical communication being performed via the laser source of the countermeasure unit, and
  - keeping alive a laser communication path by tracking retroreflections.

13. The method according to claim 12, further comprising:
- switching between a laser communication mode and a countermeasure mode,
- wherein in the laser communication mode the laser beam source is caused to modulate the outgoing laser beam to transmit information and in the countermeasure mode the laser beam source is caused to modulate the outgoing laser beam to dazzle or to jam an object of threat as a countermeasure.

* * * * *